(12) United States Patent
Ellson

(10) Patent No.: US 10,981,171 B2
(45) Date of Patent: *Apr. 20, 2021

(54) ROUGHLY CYLINDRICAL SAMPLE CONTAINERS HAVING MULTIPLE RESERVOIRS THEREIN AND BEING ADAPTED FOR ACOUSTIC EJECTIONS

(71) Applicant: LABCYTE INC., Sunnyvale, CA (US)

(72) Inventor: Richard N. Ellson, Palo Alto, CA (US)

(73) Assignee: Labcyte Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,659

(22) Filed: Oct. 13, 2017

(65) Prior Publication Data

US 2018/0169651 A1 Jun. 21, 2018

Related U.S. Application Data

(63) Continuation of application No. 14/595,063, filed on Jan. 12, 2015, now Pat. No. 9,861,987.

(60) Provisional application No. 61/927,878, filed on Jan. 15, 2014.

(51) Int. Cl.
*B01L 3/00* (2006.01)
*B01L 3/02* (2006.01)

(52) U.S. Cl.
CPC ....... *B01L 3/50857* (2013.01); *B01L 3/50855* (2013.01); *B01J 2219/00313* (2013.01); *B01J 2219/00319* (2013.01); *B01J 2219/00362* (2013.01); *B01L 3/0244* (2013.01); *B01L 3/0268* (2013.01); *B01L 2400/0436* (2013.01)

(58) Field of Classification Search
USPC .............................. 73/864.01, 864.02, 864.11
See application file for complete search history.

(56) References Cited

U.S. PATENT DOCUMENTS

| 2,971,674 | A | * | 2/1961 | Wicoff | A47J 47/14 |
| | | | | | 206/199 |
| 3,523,756 | A | * | 8/1970 | Loebl | G01N 21/253 |
| | | | | | 356/39 |
| 4,308,547 | A | | 12/1981 | Lovelady et al. | |
| 4,930,263 | A | | 6/1990 | Rando | |

(Continued)

FOREIGN PATENT DOCUMENTS

| CN | 101529448 A | 9/2009 |
| CN | 102271813 A | 12/2011 |

(Continued)

OTHER PUBLICATIONS

U.S. Appl. No. 61/927,395, dated Jan. 14, 2014, Majilof et al.

(Continued)

*Primary Examiner* — Clayton E. LaBalle
*Assistant Examiner* — Warren K Fenwick
(74) *Attorney, Agent, or Firm* — Faegre, Drinker Biddle & Reath LLP

(57) ABSTRACT

Provided herein is generally tubular container, preferably including a plurality of reservoirs defined therein. The container can be adapted for acoustic ejection of a fluid disposed within at least one of the reservoirs of the plurality of reservoirs. Alternatively, the container can be adapted for extraction of a fluid disposed within at least one of the reservoirs of the plurality of reservoirs using a non-acoustic liquid handling method.

20 Claims, 6 Drawing Sheets

(56) References Cited

U.S. PATENT DOCUMENTS

| | | | | |
|---|---|---|---|---|
| 4,951,739 A * | 8/1990 | Cates | ................... | F28D 20/026 126/400 |
| 5,796,422 A * | 8/1998 | Hanson | ................. | B41J 2/4155 347/103 |
| 5,821,524 A | 10/1998 | Horlbeck et al. | | |
| 6,385,431 B1 * | 5/2002 | Arcaro | .................. | B65H 9/166 271/278 |
| 6,548,308 B2 * | 4/2003 | Ellson | ..................... | B01J 13/04 347/46 |
| 6,610,223 B2 * | 8/2003 | Lee | ............................ | B01J 2/02 264/5 |
| 6,666,541 B2 * | 12/2003 | Ellson | .................. | B01J 19/0046 347/46 |
| 6,802,593 B2 * | 10/2004 | Ellson | .................. | B01J 19/0046 347/46 |
| 6,938,995 B2 * | 9/2005 | Mutz | ..................... | B01L 3/0268 347/75 |
| 7,354,141 B2 * | 4/2008 | Ellson | ................... | B01L 3/0268 347/46 |
| 7,784,331 B2 * | 8/2010 | Ellson | .................. | B01L 3/0268 73/61.49 |
| 7,854,343 B2 * | 12/2010 | Ellson | ................. | B01L 3/50853 220/256.1 |
| 7,900,505 B2 * | 3/2011 | Mutz | .................... | G01N 29/028 73/64.53 |
| 8,252,603 B2 * | 8/2012 | Ellson | ................. | B01L 3/50853 220/507 |
| 9,861,987 B2 * | 1/2018 | Ellson | ................. | B01L 3/50857 |
| 2001/0002986 A1 | 6/2001 | Fattinger et al. | | |
| 2003/0039590 A1 | 2/2003 | Lodge | | |
| 2003/0048341 A1 * | 3/2003 | Mutz | .................... | B01J 19/0046 506/12 |
| 2005/0106619 A1 | 5/2005 | Bierre et al. | | |
| 2008/0014123 A1 | 1/2008 | Voho | | |
| 2008/0121688 A1 | 5/2008 | Harrop | | |
| 2012/0198947 A1 * | 8/2012 | Lind | ....................... | B01L 3/021 73/864.01 |
| 2012/0220184 A1 * | 8/2012 | Orem | ..................... | A63H 33/28 446/16 |
| 2013/0109042 A1 | 5/2013 | Ellson et al. | | |
| 2013/0306732 A1 | 11/2013 | Berssen et al. | | |
| 2015/0196904 A1 | 7/2015 | Ellson | | |
| 2015/0197372 A1 | 7/2015 | Majlof et al. | | |
| 2016/0193601 A1 * | 7/2016 | Magnusson | ............. | B01L 3/022 73/864.01 |

FOREIGN PATENT DOCUMENTS

| | | |
|---|---|---|
| CN | 103299195 A | 9/2013 |
| DE | 10-2013-206967 | 11/2014 |
| EP | 1348485 A1 | 10/2003 |
| EP | 2070012 | 6/2009 |
| EP | 2289625 | 3/2011 |
| EP | 2623204 A1 | 8/2013 |
| JP | 54-071693 | 6/1979 |
| JP | 60-058242 | 4/1985 |
| JP | 02-310685 | 12/1990 |
| JP | H08-166765 A | 6/1996 |
| JP | 11-160325 | 6/1999 |
| JP | 2002-082120 | 3/2002 |
| JP | 2005-530140 | 10/2005 |
| JP | 2010-503076 | 1/2010 |
| WO | WO 1984/000313 | 2/1984 |
| WO | WO 1992/004978 | 4/1992 |
| WO | WO 2012/094114 | 7/2012 |
| WO | WO 2012/149314 | 11/2012 |
| WO | WO 2015/108807 | 7/2015 |

OTHER PUBLICATIONS

U.S. Appl. No. 14/595,073, dated Jan. 12, 2015, Majilof et al.
China Patent Office, Office Action dated Jul. 17, 2017, in Application No. 201580012743.3.
China Patent Office, Office Action dated May 24, 2018, in Application No. 201580012743.3.
China Patent Office, Office Action dated Jan. 17, 2019, in Application No. 201580012743.3.
China Patent Office, Office Action dated Sep. 23, 2019, in Application No. 201580012743.3.
European Patent Office, Communication pursuant to Rule 164(2)(b) and Article 94(3) EPC dated Sep. 13, 2018, in Application No. 15706073.2.
European Patent Office, Communication pursuant to Article 94(3) EPC dated Jun. 12, 2019, in Application No. 15706073.2.
Japan Patent Office, Office Action dated Sep. 18, 2018, in Application No. 2016-546433.
Japan Patent Office, Decision to Grant dated Feb. 19, 2019, in Application No. 2016-546433.
Patent Cooperation Treaty, International Search Report dated Jun. 29, 2015, for PCT/US2015/010980.
Patent Cooperation Treaty, Written Opinion of the International Searching Authority dated Jun. 29, 2015, for PCT/US2015/010980.
Weiβ et al., "The best material for original Eppendorf Tubes® and Plates: Properties and chemical resistance of polypropylene," Eppendorf AG, Application Note No. 056, Jun. 2013.
China Patent Office, Office Action dated Jun. 8, 2020, in Application No. 201580012743.3.
Japan Patent Office, Office Action dated Apr. 21, 2020, in Application No. 2019-079375.
European Patent Office, Communication with Extended European Search Report dated Feb. 1, 2021, in Application No. 20199411.8.

\* cited by examiner

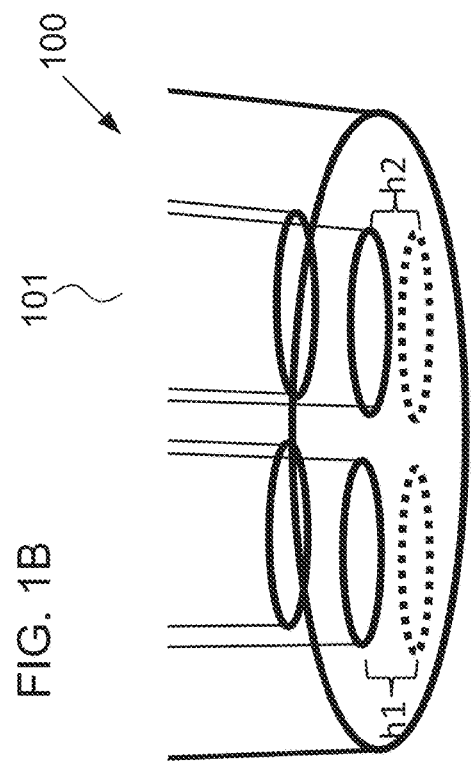
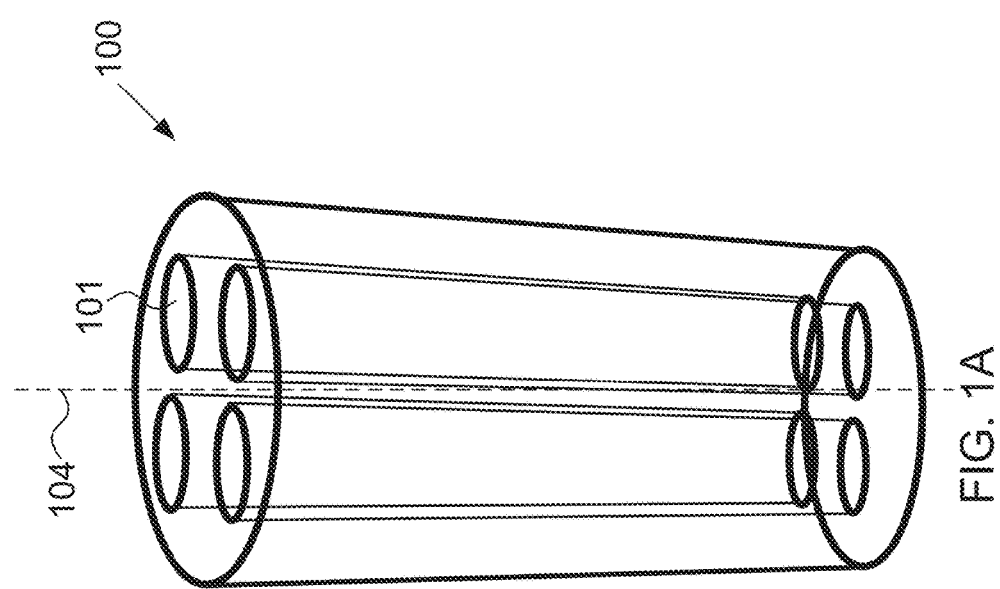

ROUGHLY CYLINDRICAL SAMPLE CONTAINERS HAVING MULTIPLE RESERVOIRS THEREIN AND BEING ADAPTED FOR ACOUSTIC EJECTIONS

CROSS-REFERENCE TO RELATED APPLICATIONS

This application is a continuation under 35 U.S.C. § 120 of U.S. patent application Ser. No. 14/595,063, filed Jan. 12, 2015 and entitled "Roughly Cylindrical Sample Containers Having Multiple Reservoirs Therein and Being Adapted for Acoustic Ejections," which claims the benefit of U.S. Provisional Patent Application No. 61/927,878, filed on Jan. 15, 2014, the entire contents of each of which are incorporated by reference herein.

BACKGROUND OF THE INVENTION

The present invention is directed to sample handling. More particularly, certain embodiments of the present invention provide sample containers adapted for acoustic ejections and analyses and methods thereof as well as containing multiple reservoirs. Merely by way of example, the invention has been applied to a biological or chemical sample container wherein multiple fluid samples, which preferably but not necessarily are related to one another, may be stored such as different concentrations of the same chemical, different fractions of a patient blood sample (e.g., plasma, buffy coat, erythrocytes) in a manner compatible with both acoustic ejection and sample handling equipment for single sample storage and retrieval. But it would be recognized that the invention has a much broader range of applicability and could be applied to any collection of samples where the retrieval of a group of samples would speed throughput by reducing the number of container storage and retrieval operations, increase the density of sample storage or allow for a larger number of aliquots of the same sample to be preserved.

It is often desired to take a chemical or biological sample (e.g., a human blood sample) contained in an individual container and to transfer it to one or more well plates or other objects appropriate for carrying out reactions and assays such as in high-throughput screening for drug discovery or in clinical diagnostics in automated clinical chemistry analyzers. An important feature for the handling of samples includes the ability to transfer small volumes from the container to enable various types of diagnostics that can benefit from consistent deliveries of small-volume samples and to be able to repeatedly extract sample from the same container.

Acoustic ejection has been known for a number of years as a way of performing transfers of samples from containers, including microplates and microtubes. For example, in a typical setup for acoustic ejection, a piezoelectric transducer is driven by a waveform chosen by a controller and in response generates acoustic energy. The acoustic energy often is focused by an acoustic lens, and coupled to a reservoir or container containing fluid through an acoustic coupling medium (e.g., water). If the focused energy has a focal point inside a fluid in the container and close to a free surface of that fluid, a droplet may be ejected. Droplet size and velocity can be controlled by the chosen waveform as mentioned above.

In some embodiments, the transducer is movable in one or more directions (e.g., in the "z direction") that is roughly perpendicular to the free surface of the fluid. The movement can take place under the control of the controller. Some acoustic instruments for high-throughput use rely on an active control of the transducer position relative to the container and address the multiplicity of reservoirs in microplates or to an individual tube or to a tube in a rack of tubes. Often, the adjustment of the transducer position involves sending a motion command to a motion controller which then initiates movement in one or more directions (e.g., along one or more axes). For example, motion in the horizontal plane (e.g., in the "x direction" and/or in the "y direction") aligns the transducer with the selected reservoir, and motion in the vertical direction (e.g., in the "z direction") is used both to audit the reservoir and to focus for droplet transfer. In another example, positioning of the transducer to achieve the proper focus for droplet ejections can be responsive to data collected from an acoustic audit. Additionally, U.S. Pat. Nos. 6,938,995 and 7,900,505 are incorporated by reference herein for all purposes. When the motion is complete, the controller can notify the system that the transducer and the selected reservoir are now in the proper position for the next step in the process. This may be further measurement of the fluid in the reservoir and/or acoustic ejection of droplets. When completed, the first reservoir is removed, and the acoustic coupling with a second reservoir may take place. Coupling fluid may remain attached to the first reservoir and would typically be at the surface facing the transducer.

Containers may include one or more fluid reservoirs. For example, a container may include one reservoir such as individual tubes, or may include a rack of separable tubes, or may include a microplate having non-separable wells. Individual tubes with one reservoir and microplates with multi-reservoirs are common, and the infrastructure for supporting the storage, retrieval and use of such tubes and plates is also common.

As is known in the art, an advantage of a single tube is that the sample therein can be stored and retrieved independently of other samples, and an advantage of a microplate is that it can store and retrieve a large number (96, 385, 1536, 3456) of samples which can be small in volume (e.g., under 1 μL for the highest density microplates).

SUMMARY OF THE INVENTION

The present invention is directed to sample handling. More particularly, certain embodiments of the present invention provide sample containers adapted for acoustic ejections and analyses and methods thereof as well as containing multiple reservoirs. Merely by way of example, the invention has been applied to a biological or chemical sample container wherein multiple fluid samples, which preferably but not necessarily are related to one another, may be stored such as different concentrations of the same chemical, different fractions of a patient blood sample (e.g., plasma, buffy coat, erythrocytes) in a manner compatible with both acoustic ejection and sample handling equipment for single sample storage and retrieval. But it would be recognized that the invention has a much broader range of applicability and could be applied to any collection of samples where the retrieval of a group of samples would speed throughput by reducing the number of container storage and retrieval operations, increase the density of sample storage or allow for a larger number of aliquots of the same sample to be preserved.

For example, there is a need for individual sample containers with the advantages of being both compatible with acoustic ejection systems that are amenable to miniaturization and can provide multiple reservoirs from a single retrieval. In particular, it would be desirable for the container to hold related materials that would be likely to be retrieved and used for a specific function, such as an assay of different samples from the same patient (e.g., different fractionations of blood or time-course samples) or various concentrations of the same compound for construction of dose response curves.

Accordingly, some embodiments of the present invention provide an individual, generally cylindrical container that is configured to contain multiple different samples. Optionally, the container may be combined with other containers, e.g., stored in association with other containers, e.g., stacked with other containers, for retrieval as a group. In one embodiment, one or more of these combinable cylindrical containers with multiple reservoirs could also be combined with at least one cylindrical container having only one reservoir.

BRIEF DESCRIPTION OF THE DRAWINGS

FIGS. 1A-1B are simplified diagrams showing a single retrievable sample container of roughly cylindrical shape having more than one reservoir where the samples are isolated from each other, optionally including an acoustically distinguishable difference in thickness in the bottoms of reservoirs in the container, according to some embodiments of the present invention.

DETAILED DESCRIPTION

Figure 2:
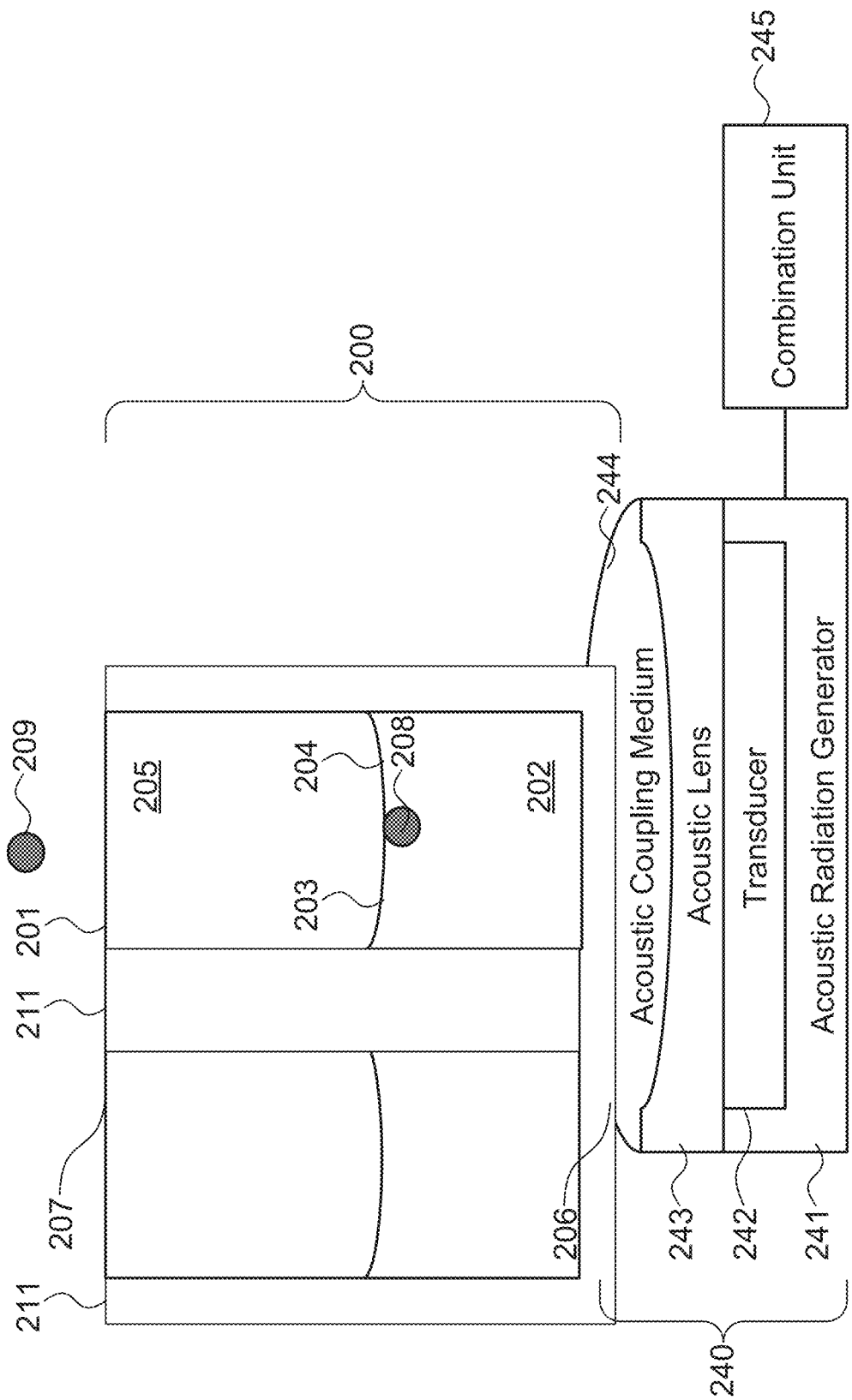
FIG. 2 is a simplified diagram showing a retrievable sample container of roughly cylindrical shape having more than one reservoir where the samples are isolated from each other, in conjunction with an acoustic ejection system, according to some embodiments of the present invention.

The present invention is directed to sample handling. More particularly, certain embodiments of the present invention provide sample containers adapted for acoustic ejections and analyses and methods thereof as well as containing multiple reservoirs. Merely by way of example, the invention has been applied to a biological or chemical sample container wherein multiple fluid samples, which preferably but not necessarily are related to one another, may be stored such as different concentrations of the same chemical, different fractions of a patient blood sample (e.g., plasma, buffy coat, erythrocytes) in a manner compatible with both acoustic ejection and sample handling equipment for single sample storage and retrieval. But it would be recognized that the invention has a much broader range of applicability and could be applied to any collection of samples where the retrieval of a group of samples would speed throughput by reducing the number of container storage and retrieval operations, increase the density of sample storage or allow for a larger number of aliquots of the same sample to be preserved.

With respect to various embodiments of the present invention, it is to be understood that this invention is not limited to specific solvents, materials, and/or device structures, as such may vary. It is also to be understood that the terminology used herein is for the purpose of describing particular embodiments only, and is not intended to be limiting.

According to some embodiments, the singular forms "a," "an," and "the" include both singular and plural referents unless the context clearly dictates otherwise. For example, reference to "a fluid" includes a plurality of fluids as well as a single fluid. In another example, reference to "a temperature" includes a plurality of temperatures as well as a single temperature.

According to certain embodiments, where a range of values is provided, it is intended that each intervening value between the upper limit and the lower limit of that range and any other stated or intervening value in that stated range is encompassed within the disclosure. For example, if a range of 1 µm to 8 µm is stated, it is intended that at least 2 µm, 3 µm, 4 µm, 5 µm, 6 µm, and 7 µm are also disclosed, as well as the range of values that are greater than or equal to 1 µm and less than or equal to 8 µm.

According to some embodiments, reference is sometimes made to "horizontal" or "vertical" in terms of acoustic ejection configuration where a fluid is in a sample container and has a free surface which is approximately horizontal (e.g., approximately perpendicular to the direction of the earth's gravity).

As discussed above, there is a need for sample containers that can simplify the full life cycle of processing biological samples (e.g., collecting, transferring, preserving, and/or analyzing biological samples) by using acoustic ejection and/or acoustic analysis, and that include multiple reservoirs that respectively may be configured to store multiple fluids. In some embodiments, the multiple reservoirs respectively are configured to store multiple different concentrations of a particular fluid.

For example, because acoustics allows for smaller reservoirs as well as the volumes extracted from them, having multiple reservoirs defined within a generally cylindrical container of conventional size is both possible and useful. For example, as provided herein, a container configured for use within a conventional microplate footprint, e.g., a microplate having 96, 385, 1536, or 3456 wells, such as a 1536 low dead-volume (LDV) microplate available from Labcyte Inc. (Sunnyvale, Calif.) or any other suitable microplate or rack, and configured for storage and retrieval using conventional robotic systems, suitably may be adapted so as to include multiple reservoirs therein. Accordingly, the number of samples that suitably may be stored, retrieved, and analyzed or used in acoustic ejection using conventional systems may be dramatically increased, and the efficiency of such storage, retrieval, analysis, and use also may be dramatically increased. Additionally, it should be noted that other, non-acoustic liquid handling procedures also suitably may be used for extracting samples from the present reservoirs, such as with a pipette, capillary, pin tool, or other method, e.g., based upon the insertion of a solid transfer device into a reservoir to extract a volume of the sample for transfer to another location.

Note that if an advantage of conventional tubes is the flexibility they provide in being selectable and separable from neighboring tubes, then it may seem counterintuitive instead to configure a tube so as to include multiple reservoirs therein, that may be inseparable from one another. However, one desirable commercial use of fluids is the ability to relatively quickly and conveniently construct dose-response curves, e.g., where the fluid contains a compound such as a drug. In an exemplary embodiment of the present invention, storing multiple concentrations of a fluid within respective reservoirs within the same tube may speed a process of constructing the same assay but with of many different concentrations of the fluid, e.g., compound or drug, without the need for the separate retrieval of multiple, separable tubes. Additionally, because dose-response curves suitably may be constructed with relatively small amounts of the same compound or drug using acoustics, the consumption of any given concentration of the compound may be relatively small. In some embodiments, placing multiple concentrations of the compound in the same tube may simplify retrieval, because retrieval and preparation of the tube suitably may supply multiple concentrations, e.g., 4 concentrations. Additionally, such a tube configuration may make better use of storage space as it provide some multiple of the concentrations, e.g., 4× the number of concentrations, in the same space relative to what may be achieved using otherwise similar tubes having only a single reservoir therein.

Additionally, the present tubes optionally may be stored in collections with one another, e.g., stacked upon one another. For example, in some embodiments, the heights of the present tubes may be larger than required to store the fluid therein, which may facilitate stacking. For example, the present tubes may be configured to as to receive caps, and the top of the cap on one tube suitably may be configured so as to engage with the bottom of another tube, e.g., to interlock with the bottom of another tube. In some embodiments, the tube with which the present tube may be interlocked also may have multiple reservoirs therein, thus enabling further multiplication of the number of fluids that may be retrieved using a single act of retrieval. In one illustrative embodiment, two stacked tubes each may include four reservoirs defined therein, and each such reservoir may include a different concentration of a fluid. Accordingly, retrieving such a stack may retrieve eight fluid concentrations at once, thus facilitating the ready preparation of an 8-point dose response based on a single retrieval. Note that any suitable number and types of tubes may be mixed and matched with one another. For example, a given stack may include any desired number of tubes that include multiple reservoirs therein, e.g., that include four reservoirs therein, may include any desired number of tubes that contain a different number of reservoirs therein, e.g., that include two reservoirs therein, and may include any desired number of tubes that include only a single reservoir therein. For example, some existing storage systems originally may have been designed to accommodate an array of large tubes, but suitably may be used instead to permit storage of an array of stacks each of a desired number of the present tubes with caps, e.g., stacks of two or more, or three or more, or four or more, or five or more, or even ten or more of the present tubes, wherein one or more of such tubes may include a plurality of reservoirs, e.g., four reservoirs.

Note that any suitable number of reservoirs may be provided within the present sample tubes, and that any suitable one or more fluids may be stored within one or more of such reservoirs. For example, as noted above, such fluids may have various concentrations of a compound, e.g., a drug. The dilution sequence may include any desirable range of concentrations. For example, in some embodiments, the various concentrations may be provided in half-log steps. However, it should be appreciated that the concentrations may be provided in 10× steps, and may be used for 16 point, half-log steps by using 1 drop as well as 3 drops to fill in the intermediate half-log steps between the full log step of concentration in the tubes.

Accordingly, the present tubes (containers) having multiple reservoirs therein suitably may facilitate the use of existing tube storage equipment, which originally may have been designed for use with larger tubes, for storage and retrieval of the present tubes, and thus may increase storage efficiency and utility for dose response construction, among other potential applications.

FIGS. 1A-1B are simplified diagrams showing a single retrievable sample container of roughly cylindrical shape having more than one reservoir where the samples are isolated from each other, optionally including an acoustically distinguishable difference in thickness in the bottoms of reservoirs in the container, according to some embodiments of the present invention. These diagrams are merely examples, as are the other diagrams herein, which should not unduly limit the scope of the claims. One of ordinary skill in the art would recognize many variations, alternatives, and modifications.

FIG. 1A illustrates an exemplary container 100 that has a generally cylindrical shape, which also may be referred to herein as a "roughly" cylindrical shape, e.g., has a cross section that is generally circular. However, it should be appreciated that the cross-section of container 100 suitably may have other geometries, e.g., may have a cross-section that is generally triangular, or that is generally rectangular, or that is generally square, or that is generally pentagonal, or that is generally hexagonal, or that has any suitable number of sides, and indeed may have any regular or irregular shape. Additionally, the cross-section of container 100 may vary along major axis 104. For example, container 100 may be tapered, e.g., such that the cross-section at one end of container 100 may be smaller or larger than the cross-section at the other end of container 100. For example, if container 100 is formed using a mold, then such a taper may facilitate removal of container 100 from the mold.

A plurality of reservoirs 101 may be defined within container 100, e.g., may extend along at least a portion of container 100 in a direction parallel to major axis 104. Preferably, reservoirs 101 may have has a cross section that is generally circular. However, it should be appreciated that the cross-section of reservoirs 101 suitably may have other geometries, e.g., may have a cross-section that is generally triangular, or that is generally rectangular, or that is generally square, or that is generally pentagonal, or that is generally hexagonal, or that has any suitable number of sides, and indeed may have any regular or irregular shape. Additionally, the cross-section of one or more of reservoirs 101 may vary along major axis 104. For example, one or more of reservoirs 101 may be tapered, e.g., such that the cross-section at one end of reservoir 101 may be smaller or larger than the cross-section at the other end of that reservoir. For example, if reservoirs 101 are formed using a mold, then such a taper may facilitate removal of container 100 and reservoirs 101 from the mold. It should be understood that container 100 may include any suitable number of reservoirs 101, e.g., two or more, or three or more, or four or more, or five or more, or six or more, or ten or more, reservoirs 101. Additionally, it should be understood that each of such reservoirs 101 within container 100 may have a shape and size that is selected independently of one or more other of such reservoirs. Preferably, each of the reservoirs defined within the container 100 may be designed for acoustic ejection. Additionally, each of reservoirs 101 optionally may be configured so as to be distinguishable acoustically from one another, so as to facilitate unique identification of the reservoirs within container 100. For example, as illustrated in FIG. 1B, each of reservoirs 101 optionally may be configured such that the bottom of container 101 has a different thickness beneath the respective reservoir. For example, the bottom of container 100 may have a thickness h1 beneath a first reservoir 101, and may have a thickness h2 beneath a second reservoir 101. Such different thicknesses optionally may be used so as to identify the individual reservoirs 101 within container 100, e.g., so as to identify the concentration of fluid within such reservoirs 101, in a manner described in greater detail below with reference to FIG. 2.

Referring again to FIG. 1A, reservoirs 101 each respectively may define a volume configured to receive a fluid, e.g., a fluid into which acoustic energy may be transmitted so as to eject a droplet of fluid. In exemplary embodiments, container 100 has a height of 10 cm or less, or 6 cm or less, or 2 cm or less, or 1 cm or less, or 1 mm or less, or 100 μm or less. In exemplary embodiments, container 100 has a diameter of 5 cm or less, or 2 cm or less, or 1 cm or less, or 0.5 cm or less, or 1 mm or less. In exemplary embodiments, each of reservoirs 101 independently may have a diameter of 1 cm or less, or 0.5 cm or less, or 1 mm or less, or 100 μm or less.

In some embodiments, one or more of the reservoirs has a volume that is different than a volume of at least one other of the reservoirs. For example, the reservoirs respectively may be configured to hold different volumes of fluid than one another. Illustratively, the difference in volume can be significant, e.g., one of the reservoirs can have a volume that is at least 10% larger than another of the reservoirs, e.g., can have a volume that is at least 50% larger than another of the reservoirs, e.g., can have a volume that is at least 100% larger than another of the reservoirs, e.g., can have a volume that is at least 400% larger than another of the reservoirs.

Preferably, the material used to provide container 100 is compatible with the fluid or fluids intended respectively to be contained within reservoirs 101. Thus, if it is intended that the reservoirs 101 contain an organic solvent such as acetonitrile, polymers that dissolve or swell in acetonitrile would be unsuitable for use in forming container 100. Similarly, reservoirs intended to contain dimethyl sulfoxide (DMSO) preferably are compatible with DMSO. For water-based fluids, a number of materials are suitable for the construction of containers and include, but are not limited to, ceramics such as silicon oxide and aluminum oxide, metals such as stainless steel and platinum, and polymers such as polyester and polytetrafluoroethylene. For fluids that are photosensitive, the container 100 may be constructed from an optically opaque material that has sufficient acoustic transparency for substantially unimpaired functioning of the device. The container 100 and reservoirs 101 therein may be prepared using any suitable technique, such as molding, machining, casting, extruding, or three-dimensional printing. As mentioned above, a cap suitably may be applied to the container 100 at a later time so as to form a closed container that encloses fluid.

FIG. 2 is a simplified diagram showing a retrievable sample container of roughly cylindrical shape having more than one reservoir where the samples are isolated from each other, in conjunction with an acoustic ejection system, according to some embodiments of the present invention.

In the embodiment illustrated in FIG. 2, container 200 is preferably axially symmetrical, e.g., cylindrical, having a plurality of sidewalls 211 extending upward from container base 206, defining a plurality of reservoirs 201 within container 200, and terminating at a plurality of openings 207, although other container shapes may be used. The material and thickness of container base 206 preferably is configured such that acoustic radiation may be transmitted therethrough and into the fluids respectively contained within reservoirs 101. Additionally, as noted above with reference to FIG. 1B, the thickness of container base 206 optionally may be different beneath each of reservoirs 201 so as to facilitate identification of each of such reservoirs using the acoustic ejection system. For example, the time of flight of sound reflecting off of the bottom of reservoirs may be used to distinguish one reservoir from the other. For example, under a first reservoir the bottom 206 may have a thickness h1 which may be the designed to be the thinnest, under a second reservoir the bottom 206 may have a thickness h2 which is thicker than h1, and so on around counter-clockwise (or in any other desired arrangement) under any other reservoirs within container 200. When the container is presented to the acoustic ejector 240 such as described in greater detail below, sonar measurements based on acoustic reflections from the bottoms of reservoirs 201 may be used to determine which reservoir in the container is which and allow for the transducer to center itself relative to each of the reservoirs.

In this regard, it should be appreciated that an exemplary advantage of acoustically readable identification and/or alignment marks, e.g., different thicknesses of bottom 206 beneath each reservoir, is that such marks may for example be made compatible to the same transducer used for ejection from the container and allow both sensing and actuation to be performed by the same device or by similar device external to the transfer station that would record or re-orient the container to pre-determined configuration. However, alternative embodiments include other alignment marks that may not necessarily be acoustically read and rather, are well known in the mechanical arts such as a key-way or use of optical marks (like barcodes or fiducials) to determine the rotational orientation and identity of the wells in the container. It should be appreciated that many other patterns or acoustically distinguishable features would be possible to suit the number of wells.

Preferably, but not necessarily, container base 206 is substantially flat, is oriented substantially perpendicular to the major axis of sidewall 211, and is configured to receive an acoustic wave and to transmit the acoustic wave to fluid 203 disposed within a selected one of reservoirs 201. For example, container 200 may be coupled to an acoustic ejector 240 that includes an acoustic radiation generator 241 for generating acoustic radiation and an acoustic lens 243 for focusing the acoustic radiation at a focal point within fluid 203 from which a droplet is to be ejected, near surface 204. The acoustic radiation generator contains a transducer 242, e.g., a piezoelectric element, commonly shared by an analyzer. In the illustrated embodiment, a combination unit 245 is provided that both serves as a controller and a component of an analyzer. For example, operating as a controller, the combination unit 245 may provide the piezoelectric element 242 with electrical energy that is converted into mechanical and acoustic energy. Or, for example, operating as a component of an analyzer, the combination unit may receive and analyze electrical signals from the transducer. The electrical signals may be produced as a result of the absorption and conversion of mechanical and acoustic energy by the transducer. Optionally, combination unit 245 also is configured so as to analyze acoustic echoes reflected from the bottoms of reservoirs 201 so as to identify each of such reservoirs, e.g., based on the time-of-flight of such acoustic echoes. Additionally, and independently of whether the thickness of bottom 206 varies beneath respective reservoirs 201, combination unit 245 optionally may be configured so as to find the center of each of reservoirs 201 via sonar. For example, acoustic ejector 240 may include a motion system (not specifically illustrated) configured to move acoustic radiation generator 241, acoustic lens 243, and acoustic coupling medium 244 relative to container 200, or vice versa. In embodiments in which the location of each reservoir 201 was not otherwise made available to combination unit 245, e.g., via pre-programming, combination unit 245 optionally may be configured so as to identify the center of each of reservoirs 201 using acoustic echoes from the bottoms of reservoirs 201, and to control the motion system so as to move acoustic ejector 240 relative to container 200 so as to center the point of focus of acoustic lens 243 at an appropriate point within a desired reservoir 201. Combination unit 245 further may be configured so as to control the motion system so as to subsequently move acoustic ejector 240 relative to container 200 so as to center the point of focus of acoustic lens 243 at an appropriate point within one or more different desired reservoirs 201, e.g., so as to eject droplets of fluid from each of reservoirs 201.

As shown in FIG. 2, acoustic lens 243 may include a single solid piece having a concave surface for focusing acoustic radiation, but the lens may be constructed in other ways such as known in the art. Acoustic ejector 240 thus may be adapted to generate and focus acoustic radiation so as to eject a droplet of fluid from surface 204 when acoustically coupled to container 200, and thus to fluid 203. Acoustic radiation generator 241 and lens 243 may function as a single unit controlled by a single controller, or they may be independently controlled, depending on the desired performance of the device. Typically, single ejector designs are preferred over multiple ejector designs because accuracy of droplet placement and consistency in droplet size and velocity are more easily achieved with a single ejector.

There are also a number of ways to acoustically couple the ejector 240 to each individual reservoir 201 and thus to the fluid therein. One such approach is through direct contact as is described, for example, in U.S. Pat. No. 4,308,547 to Lovelady et al., wherein a lens constructed from a hemispherical crystal having segmented electrodes is submerged in a fluid to be ejected. The aforementioned patent further discloses that the lens may be positioned at or below the surface of the fluid. However, this approach for acoustically coupling the lens to a fluid is undesirable when the ejector is used to eject different fluids in a plurality of containers or reservoirs, as repeated cleaning of the lens would be required in order to avoid cross-contamination. The cleaning process would necessarily lengthen the transition time between each droplet ejection event. In addition, in such a method, fluid would adhere to the ejector as it is removed from each container, wasting material that may be costly or rare.

Thus, one exemplary approach would be to acoustically couple the ejector to the container without contacting any portion of the ejector, e.g., lens 243, with any of the fluids to be ejected. To this end, ejector 240 suitably may be positioned in controlled and repeatable acoustic coupling with container 200 to respectively eject droplets from reservoirs 201 therein, without submerging the ejector therein.

For example, acoustic coupling may be achieved between the ejector and container 200 through indirect contact, such as illustrated in FIG. 2. For example, acoustic coupling medium 244 may be placed between ejector 240 and base 206 of container 200, with the ejector and container located at a predetermined distance from each other. The acoustic coupling medium 244 may be an acoustic coupling fluid, preferably an acoustically homogeneous material in conformal contact with both acoustic lens 243 and base 206 of container 200. Preferably, acoustic coupling medium 244 is substantially free of material having different acoustic properties than the fluid medium itself. Furthermore, it is preferred that acoustic coupling medium 244 includes a material having acoustic properties, e.g., acoustic impedance, that facilitate the transmission of acoustic radiation from acoustic lens 243 to bottom surface 206 and into container 200 without significant attenuation in acoustic pressure and intensity. For example, as illustrated in FIG. 2, acoustic coupling medium 244 may couple container 200 to acoustic lens 243, such that an acoustic wave generated by acoustic radiation generator 241 is directed by the lens 243 into the acoustic coupling medium 244 which then transmits the acoustic wave into the container 200. For example, combination unit 245 may control a motion system (not specifically illustrated) so as to center lens 243 beneath a selected one of reservoirs 201. The acoustic wave preferably focuses to a focal point 208 near the surface 204 of fluid 203 within that reservoir 201 in order to eject at least one droplet 209 of the fluid. For further details of exemplary acoustic ejection systems and uses thereof, see U.S. Pat. Nos. 6,938,995 and 7,900,505.

Figure 3C:
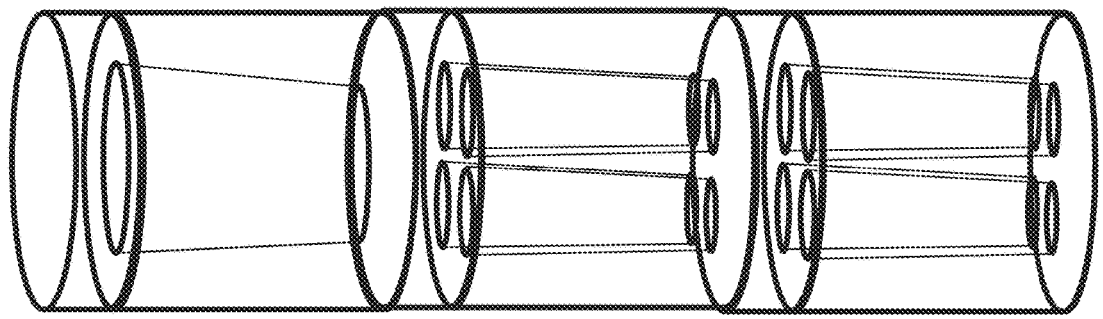
FIGS. 3A-3C illustrate exemplary configurations for storing sample containers with multiple reservoirs therein either singly or in combination with other containers, e.g., stacked with other containers, according to some embodiments of the present invention.
Figure 3B:
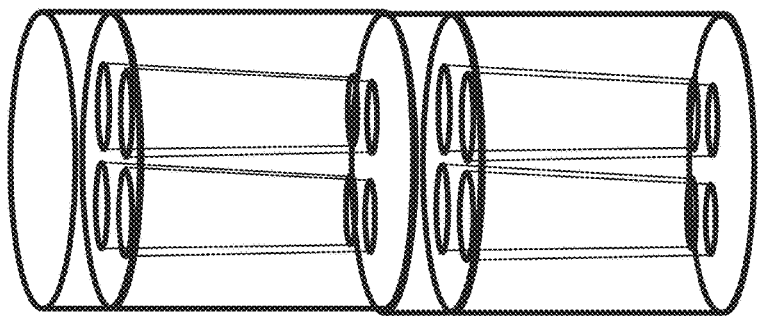
Figure 3A:
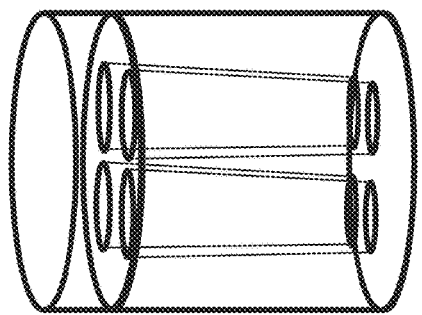

FIGS. 3A-3C illustrate exemplary configurations for storing sample containers with multiple reservoirs therein either singly or in combination with other containers, e.g., stacked with other containers, according to some embodiments of the present invention. For example, FIG. 3A illustrates an exemplary embodiment in which a sample container that includes multiple reservoirs therein, e.g., four reservoirs, may be stored separately from other containers. FIG. 3B illustrates another exemplary embodiment in which a pair of sample containers, each of which independently may include one or multiple reservoirs therein, e.g., four reservoirs each, may be stored together in a collection, e.g., may be stacked. FIG. 3C illustrates yet another exemplary embodiment in which three sample containers, each of which independently may include one or multiple reservoirs therein, e.g., four reservoirs in two of the containers, and one reservoir in another of the containers, may be stored together in a collection, e.g., may be stacked. As noted above, such collecting, e.g., stacking may facilitate efficient storage, retrieval, and analysis of fluids. For example, in the stack illustrated in FIG. 3B or the stack illustrated in FIG. 3C, the various reservoirs within the stack optionally may include different concentrations of the same fluid. Accordingly, retrieving one of such stacks suitably may retrieve such concentrations, thus facilitating rapid analysis and acoustic ejection, e.g., may facilitate rapid preparation of dose-response curves. Alternatively, one or more of the reservoirs within the containers in a given stack may store fluids that are unrelated to one another, and as such, retrieving one of such stacks suitably may retrieve such unrelated fluids. As may be seen in FIGS. 3B-3C, each container optionally may include a cap, and the cap of one container may engage with, e.g., may interlock with, the base of another container.

Figure 4A:
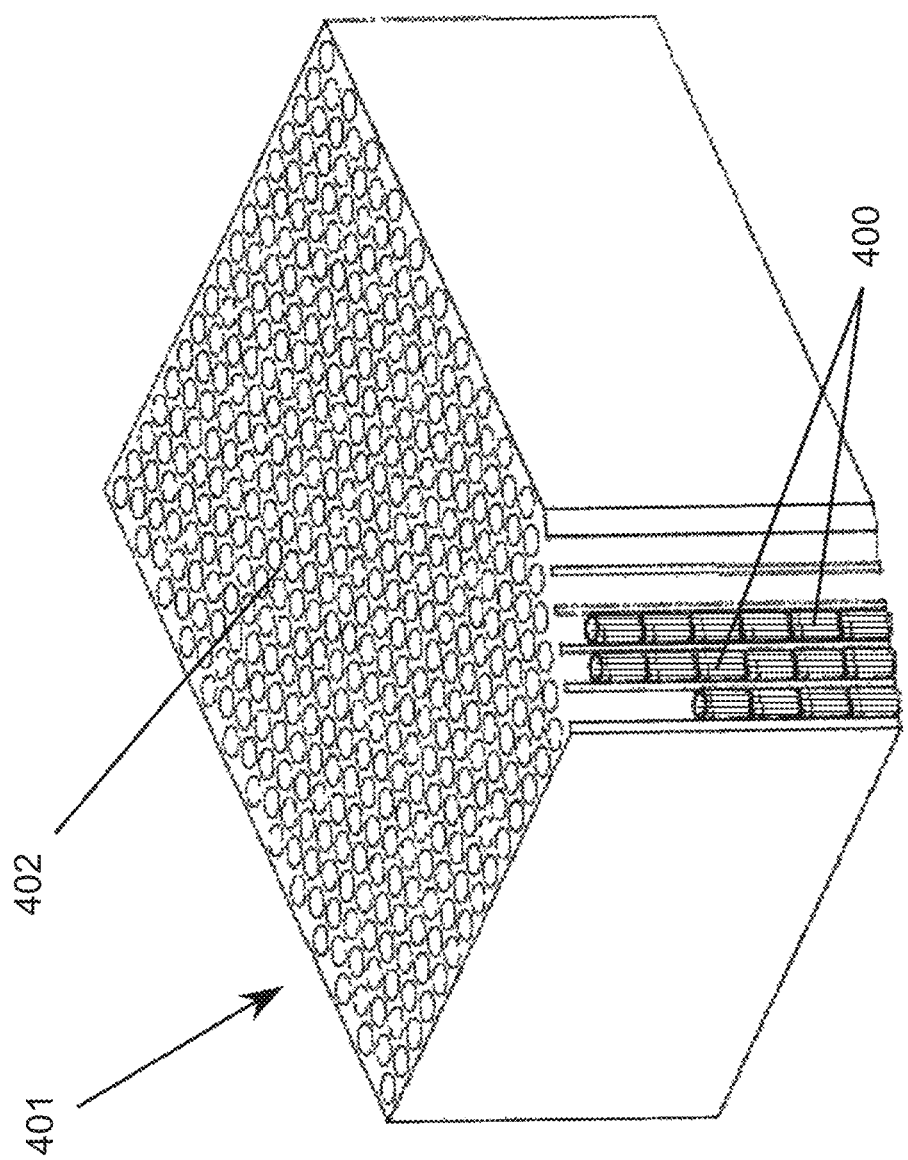
FIG. 4A shows illustrates an exemplary rack for storing combinations, e.g., stacks of roughly cylindrical containers with multiple reservoirs therein for storage and retrieval.
Figure 4B:
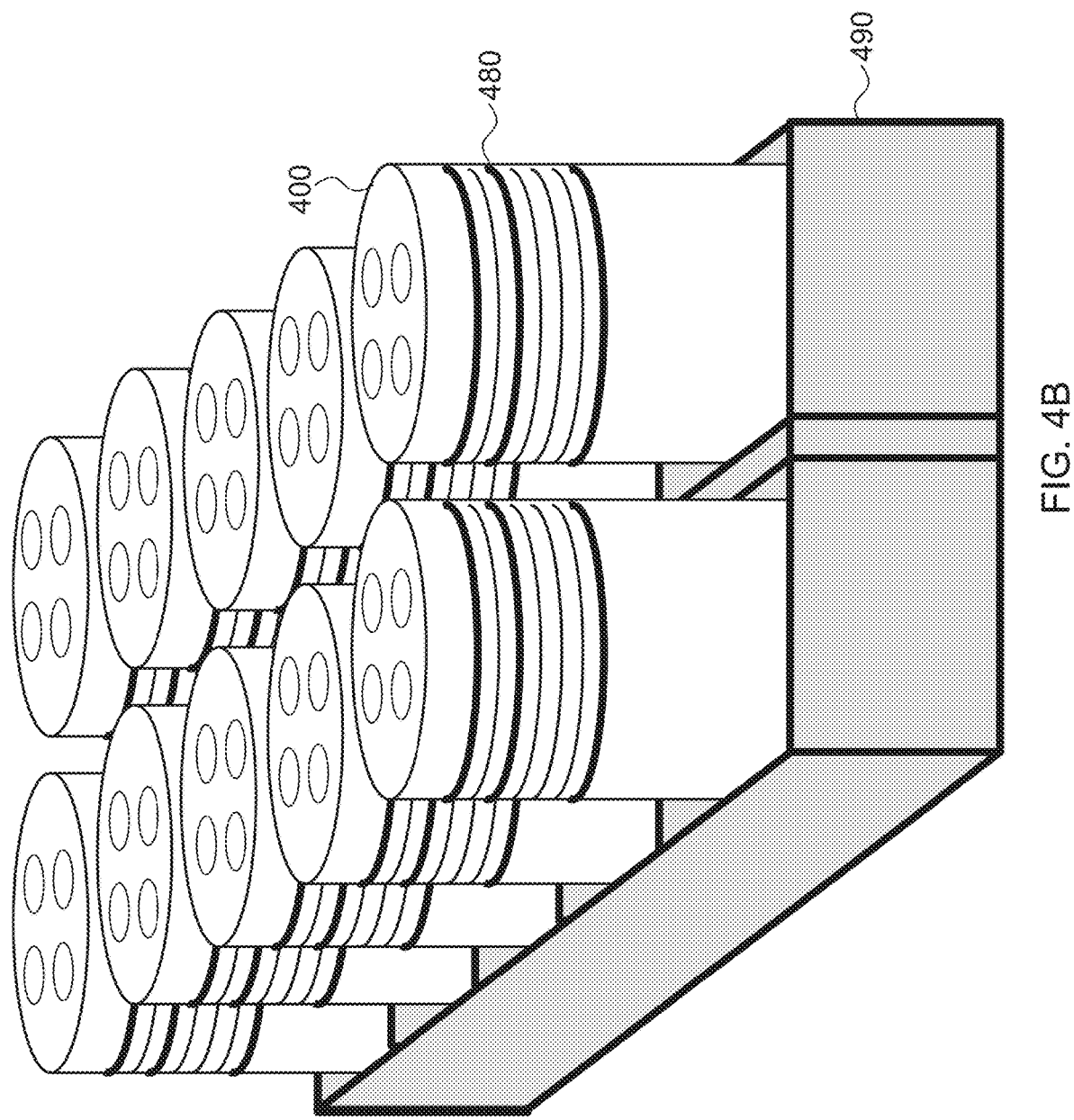
FIG. 4B illustrates an exemplary rack for individually holding roughly cylindrical containers with multiple reservoirs therein for analysis or acoustic ejection, according to some embodiments of the present invention.

FIG. 4A shows illustrates an exemplary rack for storing combinations, e.g., stacks of roughly cylindrical containers with multiple reservoirs therein for storage and retrieval, and FIG. 4B illustrates an exemplary rack for individually holding roughly cylindrical containers with multiple reservoirs therein for analysis or acoustic ejection, according to some embodiments of the present invention. These containers may be stored sealed or lidded (capped) with single-use seals or more preferred embodiment of a multi-use lid (cap) or multi-use septum which could be opened to facilitate acoustic transfer. Preferably, but not necessarily, the containers and lids are stackable with a roughly cylindrical exterior. Also, the de-stacking, de-lidding, re-lidding and re-stacking of the containers and lids may be performed in a variety of ways known to those of skill in the art, and it is contemplated that other methods may emerge in the future that may also be used with the present invention to facilitate the retrieval, stacking, or destacking processes and preservation of materials within the container. In the exemplary embodiment illustrated in FIG. 4A, a plurality of containers 400 having multiple reservoirs therein may be stacked and stored within each of a plurality of apertures 402 defined within a rack 401. At a desired time, one or more stacks of containers 400 may be removed and the containers then may be disposed (de-stacking and de-lidding as needed) within respective spaces within rack 490 for acoustic analysis or ejection. Following such acoustic analysis or ejection, the containers then may be re-stacked and/or re-lidded as needed within an aperture defined within rack 401 for storage until a later time. See, e.g., European Patent Publication No. EP 1348485, the entire contents of which are incorporated herein by reference for all purposes, for examples of suitable racks mechanisms for manipulating stacks of containers.

Figure 5B:
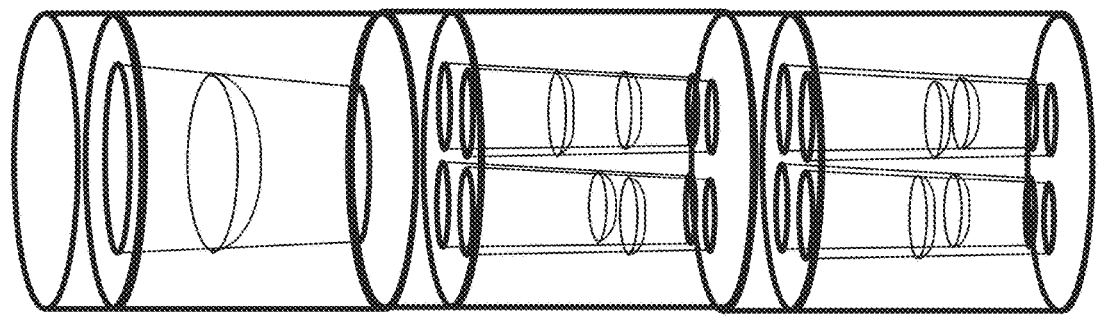
FIG. 5A-5B are simplified diagrams showing exemplary collections of multiple sample containers surface with their corresponding seals (or lids) stacked as a linked assembly with roughly cylindrical exterior for storage or retrieval with different concentrations in each well, according to some embodiments of the present invention.
Figure 5A:
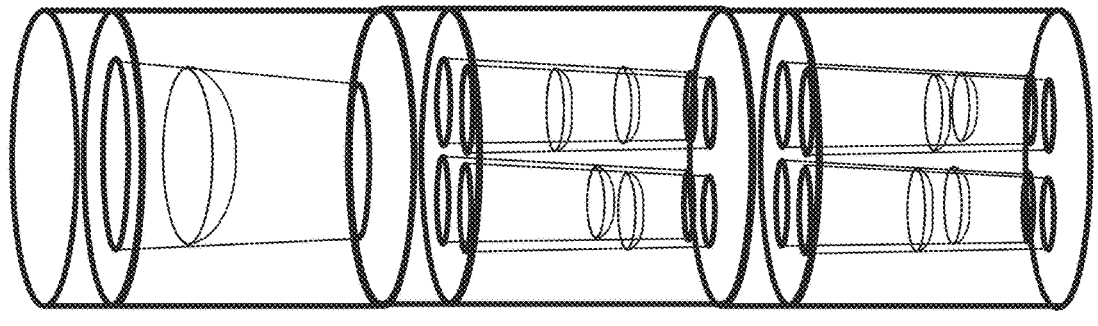

FIG. 5A-5B are simplified diagrams showing exemplary collections of multiple sample containers surface with their corresponding seals (or lids or caps) stacked as a linked assembly with roughly cylindrical exterior for storage or retrieval with different concentrations in each well, according to some embodiments of the present invention. In the embodiment illustrated in FIG. 5A, 3 sample containers are shown in a stacked configuration wherein each container has a lid and the composite exterior for the containers is roughly cylindrical. The retrieval of a stack of containers as shown in the specific example of FIG. 5A shows a mixed stack of containers with one containing a high-concentration of a compound in solution in the top, single-reservoir container designated 1×, and lower concentrations of the compound in solution in each of the multi-reservoir containers wherein the concentration is designated by 3×, 10× and so on to reflect the level of dilution. This roughly corresponds to half-log dilution steps for the concentrations. With these containers, the span of concentrations is 4 logs or 1× to 10,000×. It should be appreciated that these concentrations, or any other desired concentrations, suitably may be arranged in any manner within the various wells of the stack of containers. For example, different configurations are shown in FIGS. 4A and 4B where one might be more amenable for transferring in a pre-made serial dilution (e.g., FIG. 4A) in and the other for dilution construction from one container to the other (e.g., FIG. 4B). For example, in one illustrative embodiment, 1 part of a well in one container could be mixed with 2 parts diluent in a well in the other container to construct a 1:3 step between the two lower containers of the stack such as in the illustrative embodiment shown in FIG. 5B. Retrieving a container stack with a serial dilution series such as in FIG. 5B may facilitate rapid construction of a 4-log span and half-log step assay, for example, when equal volumes of each of these was is transferred to corresponding assay wells. While illustrated with a half log step, the step in storage concentrations suitably may be a different number, larger or smaller, such as 2 or 10. In the case of 10, or full log steps, intermediate concentrations can be constructed by varying the amount transferred from the wells to fill in the half log steps. For example, if the containers hold in any order 1×, 10×, 100×, and so on, corresponding to log steps in concentrations, then dose response assay with half-log steps may be constructed in a series of assay wells through the acoustic transfer of a different number of droplets. In such an example, a droplet from the 1× concentration well may form the highest concentration assay well, 3 droplets of the same volume as the 1× droplet but transferred from the 10× dilution may form the $2^{nd}$ highest concentration assay well, 1 droplet of the same volume as the previous one from the 10× dilution to the $3^{rd}$ highest concentration destination assay well, 3 droplets from the 100× dilution may form the next assay well, and so on. It should be appreciated that those of skill in the art could design many configurations of different concentrations or dilutions (e.g., in even log steps such as described above, or other dilutions), whose intermediate values were filled in with various volumes to construct dose response assays. It is also contemplated that the reservoirs could also be used to carry the diluent or control samples or other materials required for the construction of the assay. In one example, the samples within a given container, or within a collection, e.g., stack of containers, may be related to one another. For example, the relationship may be from fractionation (e.g., centrifugation), liquid chromatography (LC) effluent, a time-series of samples obtained from a patient, or DNA samples from close relatives, among others.

Note that in some embodiments, it may be desirable to rotate the present containers so as to arrange the reservoirs therein in the proper place for acoustic analysis or ejection. Suitable methods for such arrangements, e.g., geometric features in the container construction to readable visual methods, suitably may be adapted for use with the present containers. Additionally, as noted above, one way to allow identification of wells is to have acoustically distinguishable features in the tube. For example, such features may be present in the bottom of the container and designed to be detected when the tube was presented to an acoustic reader or a transfer device. One preferred embodiment would be to have one or more of the wells at measurably different thickness from the others to provide a reference for which well is which in the tube. The time of flight for sound in between the bottom of the tube and bottom of each reservoir could then be used to determine the orientation/identity of the reservoir within the tube (e.g., is it reservoir #1, #2, #3 or #4). Each of these separable multi-reservoir tubes could also be provided with an identification mark such as described in provisional patent application No. 61/927,395, filed Jan. 14, 2014 and entitled "Sample Containers Having Identification Marks Embedded Therein and Being Adapted for Acoustic Ejections," the entire contents of which are incorporated by reference herein for all purposes. For example, FIG. 4B illustrates an exemplary identification mark 480 disposed on each of containers 400. It should be understood that use of such identification marks is purely optional.

Under one non-limiting aspect of the present invention, a generally tubular container includes a plurality of reservoirs defined therein. Illustratively, such a container is described above with reference to FIGS. 1A, 1B, 2, 3A, 3B, 3C, 4A, 4B, 5A, and 5B.

In some embodiments, the generally tubular container is adapted for acoustic ejection of a fluid disposed within at least one of the reservoirs of the plurality of reservoirs.

In some embodiments, a plurality of fluids are respectively disposed within the reservoirs of the plurality of reservoirs. Optionally, the plurality of fluids are selected from the group consisting of: different samples from the same patient, different fractions of a sample from a patient, and different concentrations of the same compound, chemical, or drug.

In some embodiments, the reservoirs isolate the plurality of fluids from one another.

In some embodiments, each reservoir includes a bottom, the bottom of at least one of the reservoirs including an acoustically distinguishable difference in thickness from the bottom of at least one other of the reservoirs.

In some embodiments, the generally tubular container is adapted for extraction of a fluid disposed within at least one of the reservoirs of the plurality of reservoirs using a non-acoustic liquid handling method. In some embodiments, the non-acoustic liquid handling method is based on the insertion of a solid transfer device into one of the reservoirs. In some embodiments, the solid transfer device includes a pipette, capillary, or pin tool.

In some embodiments, the plurality of reservoirs include three or more reservoirs.

In some embodiments, a cross-section of the generally tubular container is generally circular.

In some embodiments, one or more of the reservoirs has a volume that is different than a volume of at least one other of the reservoirs. For example, the reservoirs respectively may be configured to hold different volumes of fluid than one another. Illustratively, the difference in volume can be significant, e.g., one of the reservoirs can have a volume that is at least 10% larger than another of the reservoirs, e.g., can have a volume that is at least 50% larger than another of the reservoirs, e.g., can have a volume that is at least 100% larger than another of the reservoirs, e.g., can have a volume that is at least 400% larger than another of the reservoirs.

In some embodiments, the generally tubular container includes a major axis, each of the reservoirs extending along at least a portion of the container in a direction parallel to the major axis.

In some embodiments, the container is tapered along the major axis.

Under another non-limiting aspect of the present invention, a stacked plurality of generally tubular containers is provided, at least one of the generally tubular containers including a plurality of reservoirs defined therein. Illustratively, such a stacked plurality of generally tubular containers is described above with reference to FIGS. 3B, 3C, 4A, 5A, and 5B. Illustratively, such a container is described above with reference to FIGS. 1A, 1B, 2, 3A, 3B, 3C, 4A, 4B, 5A, and 5B.

In some embodiments, the stacked plurality of generally tubular containers is retrievable as a group.

In some embodiments, the at least one of the generally tubular containers is adapted for acoustic ejection of a plurality of fluids respectively disposed within the reservoirs of the plurality of reservoirs.

Under another non-limiting aspect of the present invention, a method includes extracting a fluid from a generally tubular container including a plurality of reservoirs defined therein. Illustratively, such a method is described above with reference to FIG. 2. Illustratively, such a container is described above with reference to FIGS. 1A, 1B, 2, 3A, 3B, 3C, 4A, 4B, 5A, and 5B.

In some embodiments, the extracting comprises acoustically ejecting the fluid.

In some embodiments, the fluid is disposed within at least one of the reservoirs of the plurality of reservoirs.

In some embodiments, a plurality of fluids are respectively disposed within the reservoirs of the plurality of reservoirs. Optionally, the plurality of fluids are selected from the group consisting of: different samples from the same patient, different fractions of a sample from a patient, and different concentrations of the same compound, chemical, or drug.

In some embodiments, extracting a fluid disposed within at least one of the reservoirs of the plurality of reservoirs comprises using a non-acoustic liquid handling method. In some embodiments, the non-acoustic liquid handling method is based on the insertion of a solid transfer device into one of the reservoirs. In some embodiments, the solid transfer device includes a pipette, capillary, or pin tool.

In some embodiments, one or more of the reservoirs has a volume that is different than a volume of at least one other of the reservoirs. For example, the reservoirs respectively may be configured to hold different volumes of fluid than one another. Illustratively, the difference in volume can be significant, e.g., one of the reservoirs can have a volume that is at least 10% larger than another of the reservoirs, e.g., can have a volume that is at least 50% larger than another of the reservoirs, e.g., can have a volume that is at least 100% larger than another of the reservoirs, e.g., can have a volume that is at least 400% larger than another of the reservoirs.

In some embodiments, each reservoir includes a bottom, the bottom of at least one of the reservoirs including an acoustically distinguishable difference in thickness from the bottom of at least one other of the reservoirs.

Some embodiments further include acoustically distinguishing the at least one of the reservoirs from the at least one other of the reservoirs.

In some embodiments, the reservoirs isolate the plurality of fluids from one another.

In some embodiments, the plurality of reservoirs including three or more reservoirs.

In some embodiments, a cross-section of the generally tubular container is generally circular.

In some embodiments, the generally tubular container includes a major axis, each of the reservoirs extending along at least a portion of the container in a direction parallel to the major axis.

In some embodiments, the container is tapered along the major axis.

Under another non-limiting aspect of the present invention, a method includes retrieving, as a group, a stacked plurality of generally tubular containers, at least one of the generally tubular containers including a plurality of reservoirs defined therein. Illustratively, such a method is described above with reference to FIGS. 3B, 3C, 4A, 5A, and 5B. Illustratively, such a container is described above with reference to FIGS. 1A, 1B, 2, 3A, 3B, 3C, 4A, 4B, 5A, and 5B.

In some embodiments, the at least one of the generally tubular containers is adapted for acoustic ejection of at least one fluid disposed within at least one of the reservoirs of the plurality of reservoirs.

All patents, patent applications, and publications mentioned herein are hereby incorporated by reference in their entireties for all purposes. However, where a patent, patent application, or publication containing one or more express definitions is incorporated by reference, those express definitions should be understood to apply to the incorporated patent, patent application, or publication in which the one or more express definitions are found, but not to the remainder of the text of this application, in particular not to the claims of this application.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed:

1. A method comprising extracting a fluid from a generally tubular container including a plurality of reservoirs defined therein, wherein the fluid is disposed within at least one of the reservoirs of the plurality of reservoirs.

2. The method of claim 1, wherein a plurality of fluids are respectively disposed with the reservoirs of the plurality of reservoirs, and wherein the plurality of fluids are selected from a group consisting of: different samples from a same patient, different fractions of a sample from a patient, and different concentrations of a same compound, chemical, or drug.

3. The method of claim 2, wherein the reservoirs isolate the plurality of fluids from one another.

4. The method of claim 1, wherein extracting the fluid from the generally tubular container comprises acoustically ejecting the fluid from the generally tubular container.

5. The method of claim 1, wherein extracting the fluid from the generally tubular container comprises extracting the fluid using one or more of: a pipette, capillary, or pin tool.

6. The method of claim 1, wherein the generally tubular container comprises four reservoirs and wherein extracting the fluid from the generally tubular container comprises extracting the fluid from one of the four reservoirs.

7. The method of claim 6, wherein each of the four reservoirs of the plurality of reservoirs has a cross section that is circular.

8. The method of claim 1, wherein at least one reservoir of the plurality of reservoirs has a cross section that is circular, rectangular, square, triangular, pentagonal, or hexagonal.

9. The method of claim 1, wherein a cross section of at least one reservoir of the plurality of reservoirs varies along a major axis of the at least one reservoir.

10. The method of claim 9, wherein the at least one reservoir is tapered such that a cross-section of a first end of the at least one reservoir is smaller than a second end of the at least one reservoir.

11. The method of claim 1, wherein each reservoir of the plurality of reservoirs are acoustically distinguishable from one another and wherein the method further comprises acoustically identifying a reservoir of the plurality of reservoirs prior to extracting the fluid from the reservoir.

12. The method of claim 11, wherein each reservoir of the plurality of reservoirs are acoustically distinguishable from one another due to the generally tubular container having a different thickness beneath each respective reservoir.

13. The method of claim 1, wherein the generally tubular container comprises at least one lid and wherein the method further comprises removing the at least one lid prior to extracting the fluid from the reservoir.

14. The method of claim 1, wherein the method further comprises re-lidding the generally tubular container after extracting the fluid from the reservoir.

15. The method of claim 1, wherein the generally tubular container is stacked with at least one other generally tubular container and wherein the method further comprises de-stacking the generally tubular container prior to extracting the fluid from the reservoir.

16. The method of claim 15, wherein the method further comprises re-stacking the generally tubular container with the at least one other generally tubular container after extracting the fluid from the reservoir.

17. A method comprising extracting a fluid from a generally tubular container including a plurality of reservoirs defined therein, a cross-section of the generally tubular container being generally circular.

18. A method comprising retrieving, as a group, a stacked plurality of generally tubular containers, at least one of the generally tubular containers including a plurality of reservoirs defined therein.

19. The method of claim 18, wherein the method further comprises extracting a fluid from at least one of the plurality of reservoirs defined in the at least one generally tubular containers, wherein extracting the fluid from the generally tubular container comprises acoustically ejecting the fluid from the generally tubular container.

20. The method of claim 19, wherein each reservoir of the plurality of reservoirs are acoustically distinguishable from one another and wherein the method further comprises acoustically identifying a reservoir of the plurality of reservoirs prior to extracting the fluid from the reservoir.

* * * * *